United States Patent [19]

McCutcheon et al.

[11] Patent Number: 4,710,893
[45] Date of Patent: Dec. 1, 1987

[54] HIGH SPEED INSTRUMENT BUS

[75] Inventors: Samuel McCutcheon, Saratoga; Jeffrey Lum, Fremont; Roman Solek, Mountain View; Troy Harrell, Sunnyvale; Robert Leman, San Jose, all of Calif.

[73] Assignee: Autek Systems Corporation, Santa Clara, Calif.

[21] Appl. No.: 623,381

[22] Filed: Jun. 22, 1984

[51] Int. Cl.$^4$ ............................................. G06F 13/00
[52] U.S. Cl. ................................................. 364/900
[58] Field of Search ... 364/200 MS File, 900 MS File; 340/825

[56] References Cited

U.S. PATENT DOCUMENTS

| | | | |
|---|---|---|---|
| 3,710,328 | 1/1973 | Hunter et al. | 364/200 |
| 3,810,103 | 5/1974 | Ricci | 364/200 |
| 4,038,642 | 7/1977 | Bouknecht et al. | 364/200 |
| 4,365,294 | 12/1982 | Stokken | 364/200 |
| 4,398,248 | 8/1983 | Hsia et al. | 364/200 |
| 4,519,034 | 5/1985 | Smith et al. | 364/200 |
| 4,589,063 | 5/1986 | Shah et al. | 364/200 |

OTHER PUBLICATIONS

Hall, *Microprocessors and Digital Systems*, 1980, McGraw-Hill, Inc., pp. 283–290.
Zaks, *Microprocessor Interfacing Techniques*, 1979, Sybex, pp. 322–351.
Pasahow, *Microcomputer Interfacing for Electronics Technicians*, McGraw-Hill, Inc., pp. 127–137.
Byte, Feb. 1983, pp. 272–298, *The IEEE Standard for the S-100 Bus*.
Buchsbaum, *Interface IC Vestpocket Handbook*, pp. 78–85 and 37–39, Prentice-Hall, Inc., 1984.

Primary Examiner—Gary V. Harkcom
Assistant Examiner—C. H. Lynt
Attorney, Agent, or Firm—Blakely Sokoloff Taylor & Zafman

[57] ABSTRACT

A high speed bus structure and data transfer method to provide data transfer capability between a central processing device and a plurality of electrical modules coupled to the bus. In the preferred embodiment, a central processing unit is coupled to a plurality of electrical modules for data reception and transmission. In a module "listen" cycle, the central processor (CP) device generates a function code which is transmitted on a command bus coupled to each electrical module. The CP device asserts data required by the particular module function on the data bus coupled to each electrical module. The CP device transmits an enable signal (ES) on an enable bus to enable the particular electrical module which is to receive data and asserts a clock signal on a clock line coupled to each module. The enabled electrical module receives valid data from the CP device upon sensing a deasserted clock line denoting the end of a clock cycle. In a module "talk" cycle, an enabled electrical module transmits data to the CP device after transmitting a service request (SRQ) signal to the awaiting CP device which has previously requested a data transmission. Upon receiving the SRQ signal, the CP device asserts an appropriate function code and clock signal. The transmitting module provides its data on the data bus which is received by the CP device as valid data once the clock line is deasserted. Other features include independent module to module communication and a power up bus poll routine for module-slot identification.

30 Claims, 8 Drawing Figures

GENERAL OPERATION

BUS POLL ROUTINE

START & SERVICE REQUEST ROUTINE

HIGH SPEED INSTRUMENT BUS

BACKGROUND OF THE INVENTION

1. Field of the Invention:

The present invention relates to apparatus and methods for transferring data between a source and a plurality of receiving electrical modules. More particularly, the present invention relates to data transfer along a bus between a source data processing device and a plurality of electrical instrumentation modules.

2. Art Background:

In the computing industry, it is quite common to transfer data and commands between a plurality of electrical modules, such as for example, computers, printers, memories, as well as digitally controlled transducers and other sensing devices, on a system or data bus. Common constraints on the speed of data transfer between electrical modules are protocol or "handshake" restrictions which require a sequence of predetermined events to occur within specified time periods prior to the actual data exchange between modules. For example, U.S. Pat. No. 3,810,103 which issued on May 7, 1974 discloses the current IEEE-488 standard for data transfer interface protocol between various electrical modules such as computers, printers, and instrumentation devices. The structure and protocol of the IEEE-488 bus inherently slows data transfer between a source and receiving electrical module in that a relatively complex handshake sequence is required prior to actual data transmission.

A typical IEEE-488 data transmission between a source and a receiving electrical module requires that the sender initialize a DAV line to a high logic state such that the receiving module then sets a NRFD ("Not Ready For Data") line to low thereby permitting the source module to check for any error conditions prior to transmitting data on a data bus. After a predetermined time, the receiving module alters the state of the NRFD line indicating it is now ready to receive data. The source module, upon sensing the NRFD state change then alters the DAV line state to indicate to the receiving module that data on the data bus lines is now valid. The receiving module, upon sensing the DAV state change, accepts the data and alters the NRFD line to indicate that it is no longer ready to accept additional data, and sets a NDAC line to high to indicate that it has now accepted the data.

The source module, having sensed that the NDAC line is now high, sets the DAV line to high to indicate to the receiving module that the data on the data bus must now be considered not valid. Further data transmissions between the source and receiving module require that this complex handshake protocol be repeated for each transmission. Moreover, in the cas where the IEEE-488 standard is used to interconnect both programmable and nonprogrammable electronic instrumentation measuring apparatus with other data processing equipment or accessories, the IEEE-488 bus is address "dependent" in that each instrumentation module coupled to the IEEE-488 bus is given a N address such that its position on the bus is unique. In other words, in order to relocate an instrumentation module to another position on the IEEE-488 bus, it is necessary to redefine the address location for the particular module.

Accordingly, in applications where it is necessary to communicate between a source data processing apparatus and a plurality of instrumentation modules, such as for example digital voltmeters, analog-to-digital (A/D) converters, temperature sensing devices, passive digital switches, programmable power supplies and the like, the existing IEEE-488 standard with its complex data transfer protocol has been found to be unacceptably slow and cumbersome.

As will be described more fully below, the present invention provides a bus and data transfer method having particular application to test measurement and instrumentation systems. The present invention incorporates a bus which permits communication between a source data processing apparatus and a plurality of instrumentation modules and external electrical control devices, and permits high speed data transfer using a minimum of transfer operation events prior to actual data transmission.

Although the present invention has particular utility with respect to instrumentation and test measurement systems, it will be appreciated that the disclosed bus structure and method may be used in numerous data transfer applications.

SUMMARY OF THE INVENTION

The present invention provides an improved high speed bus and data transfer method which is most advantageously used in conjunction with digital instrumentation and test measurement systems, to provide improved data transfer capability between a central processing device or other data processing apparatus and a plurality of electrical instrument modules coupled to the bus. In the preferred embodiment, a central processing unit is coupled to a plurality of electrical instrument modules for data reception and transmission. In a module "listen" cycle, the central processor (CP) device generates a function code which is transmitted on a command bus coupled to each electrical module. This function code (FC) corresponds to a unique data operation, which may include by way of example, a request for module identification, a command to set a variable parameter in a given module (for example voltage range) or the like. The CP device asserts data (for example the voltage range) required by the particular module function on the data bus coupled to each electrical instrument module. The CP device transmits an enable signal (ES) on an enable bus to enable the particular electrical module which is to receive data and asserts a clock signal on a clock line coupled to each module. The enabled electrical module receives valid data from the CP device upon sensing a deasserted clock line denoting the end of a clock cycle.

Upon power-up, or on request, the present invention initiates a "poll" sequence whereby a module identification request function code is sent to each module address location coupled to the bus. Each module identifies itself to the CP device by transmitting data corresponding to its model number or device type. The module identification numbers received by the CP unit are stored in a table within memory means of the CP device for later use.

In a module "talk" cycle, an enabled electrical instrument module transmits data to the CP device after transmitting a service request (SRQ) signal to the awaiting CP device which has previously requested a data transmission. Upon receiving the SRQ signal, the CP device asserts an appropriate function code and clock signal. The transmitting module provides its data on the data bus which is received by the CP device as valid data once the clock line is deasserted. Accordingly, data may be transmitted and received between the central processing device and electrical instrument modules at high speed with a minimum number of handshake events prior to actual data transfer.

Clocking means for providing simultaneous clock signals to each electrical module regardless of its relative position on the bus is provided. In addition, each module is coupled to a plurality of bias power lines which may be independently selected, in order to provide proper bias power to each electrical module. Accordingly, the various electrical instrument modules coupled to the bus structure may comprise electrical components for different logic families (e.g. TTL or ECL).

DETAILED DESCRIPTION OF THE PRESENT INVENTION

A high speed bus and data transfer method is disclosed having a particular application for use in instrumentation control and test measurement systems. In the following description for purposes of explanation, specific numbers, bytes, registers, addresses, times, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention uneccessarily.

Figure 1:
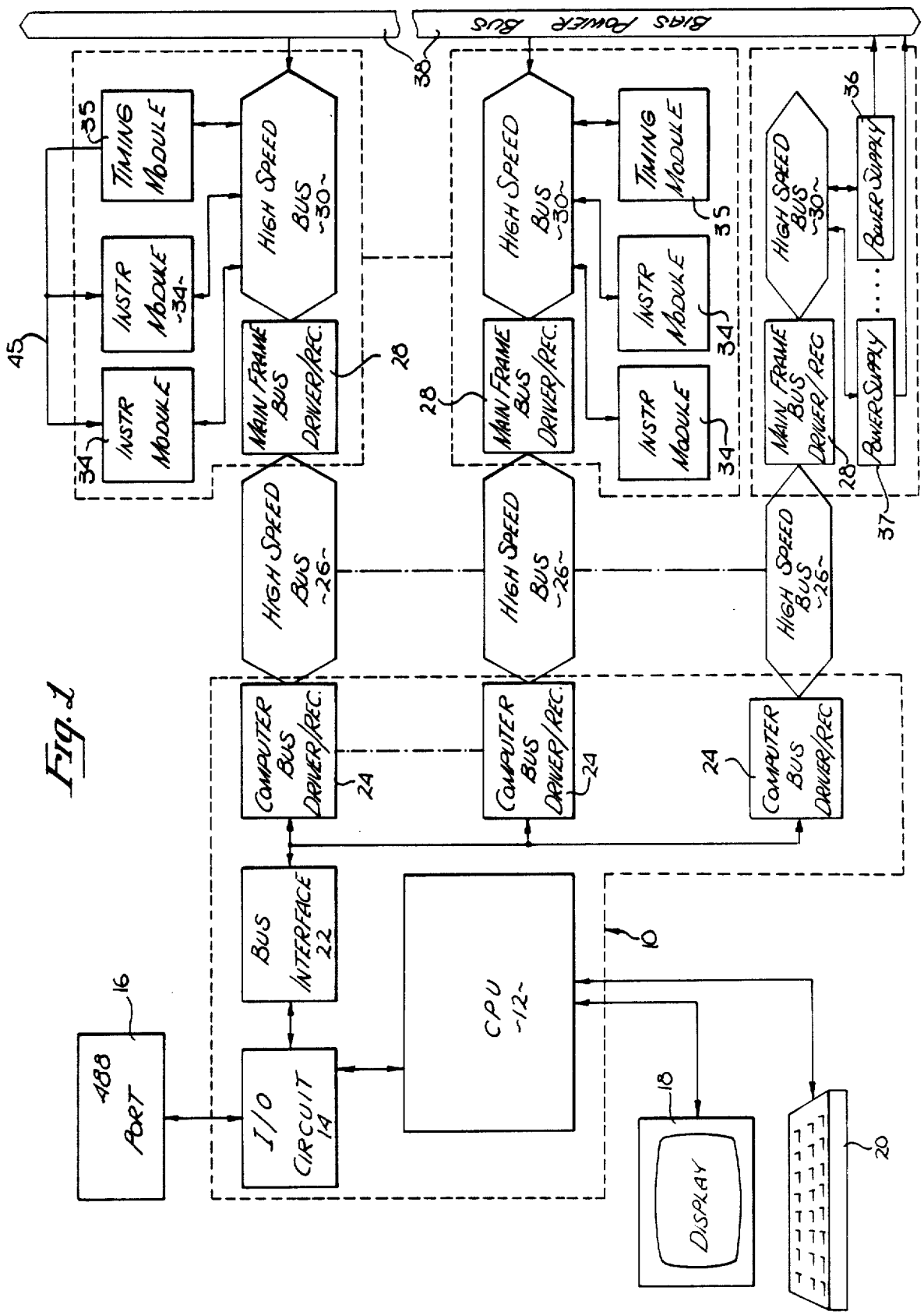
FIG. 1 illustrates the presently preferred embodiment of the invention including a central processing device coupled to a plurality of electrical instrument modules through a high speed bus.

Referring now to FIG. 1, the presently preferred embodiment of the invention includes a central processing (CP) device denoted generally by the numeral 10. Central processing device 10 includes a central processing unit 12, which is coupled to an input/output (I/O) circuit 14 used to communicate information in appropriately structured form to and from the other parts of the central processing device 10. I/O circuit 14 also includes an IEEE-488 port 16 which permits the CP device 10 to communicate with other electrical devices using standard IEEE-488 protocol as described in U.S. Pat. No. 3,810,103. Central processing unit 12 is further coupled to a display 18, and an input device 20 such as for example the keyboard illustrated in FIG. 1. As shown, central processing device 10 is coupled through a bus interface circuit 22 and computer bus driver/receiver circuits 24 to a plurality of primary high speed bus 26. The primary high speed bus 26 are each coupled to main frame bus driver/receiver circuits 28 which are each in turn coupled to another secondary high speed bus 30. As illustrated, a plurality of electrical instrument modules 34 are coupled to each high speed bus 30 and may communicate with the central processing device 10 through high speed busses 26 and 30. In the present embodiment, sixty-two electrical instrument modules may be coupled to the central processing device 10 using the high speed bus of the present invention. In addition, a timing module 35 is coupled to each secondary bus 30 and instrument module 34 for bus timing control and error detection, as will be described.

As illustrated in FIG. 1, a plurality of programmable bias power supply modules (e.g. 36 and 37) are coupled to one of the high speed bus 30, and a bias power supply bus 38. The bias power bus 38 is in turn coupled to bias power lines 39 within each high speed bus 30. As will be described, the programmable bias power supply modules selectively provide bias power to each of the instrument modules 34, thereby permitting the instrument modules to employ devices from varous logic families (e.g. TTL or ECL).

Although presently central processing device 10 comprises a digital computer, it will be apparent from the discussion which follows that central processing device 10 may comprise a remote computer controlled work station, a plurality of computers, or another instrument module 34 having sufficient data processing capability to control bus operation.

Figure 2:
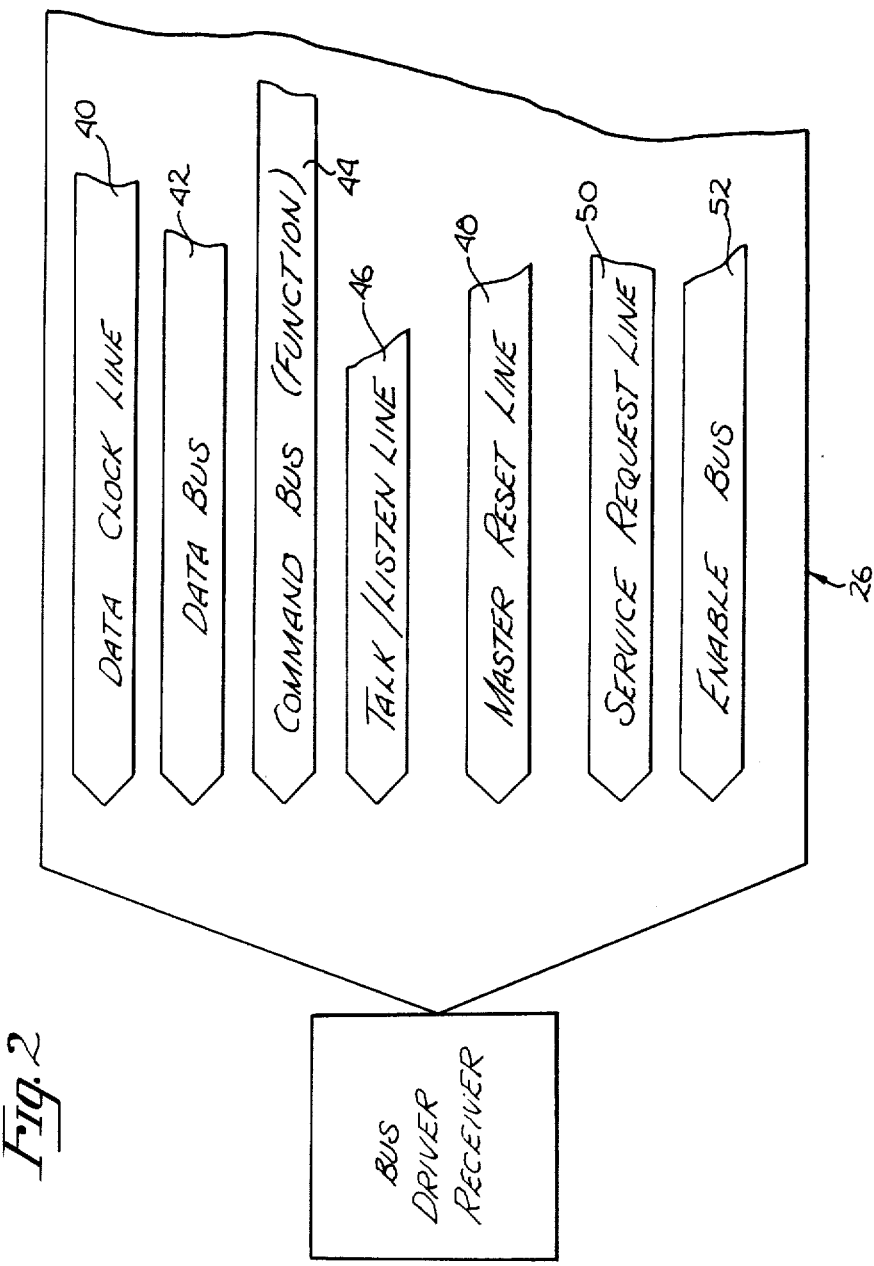
FIG. 2 diagrammatically illustrates the various sub-bus structures comprising the primary high speed bus of the present invention.
Figure 3:
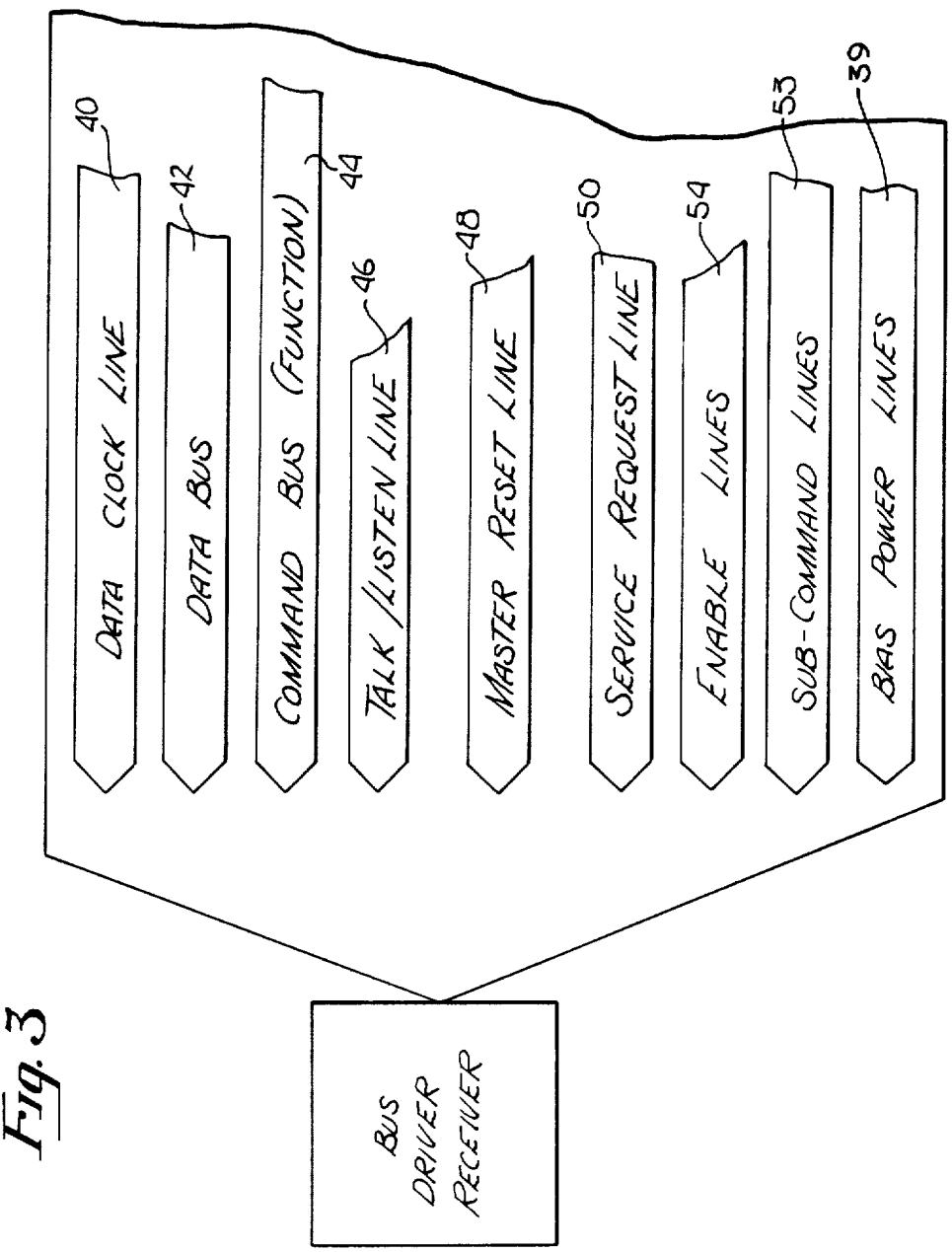
FIG. 3 diagramatically illustrates the various sub-buses comprising the secondary high speed bus of the present invention.

Referring now to FIGS. 2 and 3, each high speed bus 26 and 30 includes a data clock line 40, a data bus 42, which in the present embodiment comprises a 16 bit parallel bus, and a command bus 44 for transmitting appropriate function codes to the electrical instrument modules 34. In addition, the high speed bus includes a talk/listen line 46 to inform the instrument modules coupled to the bus of the direction of data transfer (i.e. to the CP device from an electrical module 34, or from the CP device 10 to an electrical module 34). The high speed bus further includes a master reset line 48 coupled to the electrical instrument modules 34 such that a reset signal may be generated by the CP device 10 in order to reset the entire system to a known internal state. A service request (SRQ) line 50 is coupled to all electrical instrument modules 34 as well as to the CP device 10, such that the instrument modules may notify the CP device 10 when a particular module 34 requires service, and an enable bus 52 (enable lines 54 for bus 30) is provided such that a particular electrical instrument module 34 may be enabled by the CP device 10 for data transmission and/or reception.

Although FIG. 1 illustrates two high speed busses (26 and 30), the overall configuration of both busses is substantially equivalent except that the enable bus 52 within the high speed bus 30 comprises effectively single enable lines 54. In operation, the address of a particular instrument module 34 to be enabled is provided by the CP device 10 on enable bus 52. This address is decoded by mainframe bus driver/receiver 28 such that a single enable line within high speed bus 30 coupled to the particular instrument module to be enabled is asserted. As will be more fully described below, secondary high speed bus 30 further includes sub-command lines 53 which may be coupled to each instrument module 34 and timing module 35, which permits bus 30 to operate independently of primary bus 26. Moreover, bias power lines 39 are provided in the structure of secondary bus 30. Bias power lines 39 are coupled to the bias power bus 38 such that bias power may be selectively provided to each instrument module 34, as will be further described below.

For purposes of clarity, unless otherwise noted, the structure and operation of the present invention's high speed bus and data transfer method will be discussed with respect to high speed bus 26 in this Specification. However, it will be understood that except for the aforementioned differences, the below description of structure and operation applies equally to the secondary bus 30.

Figure 7:
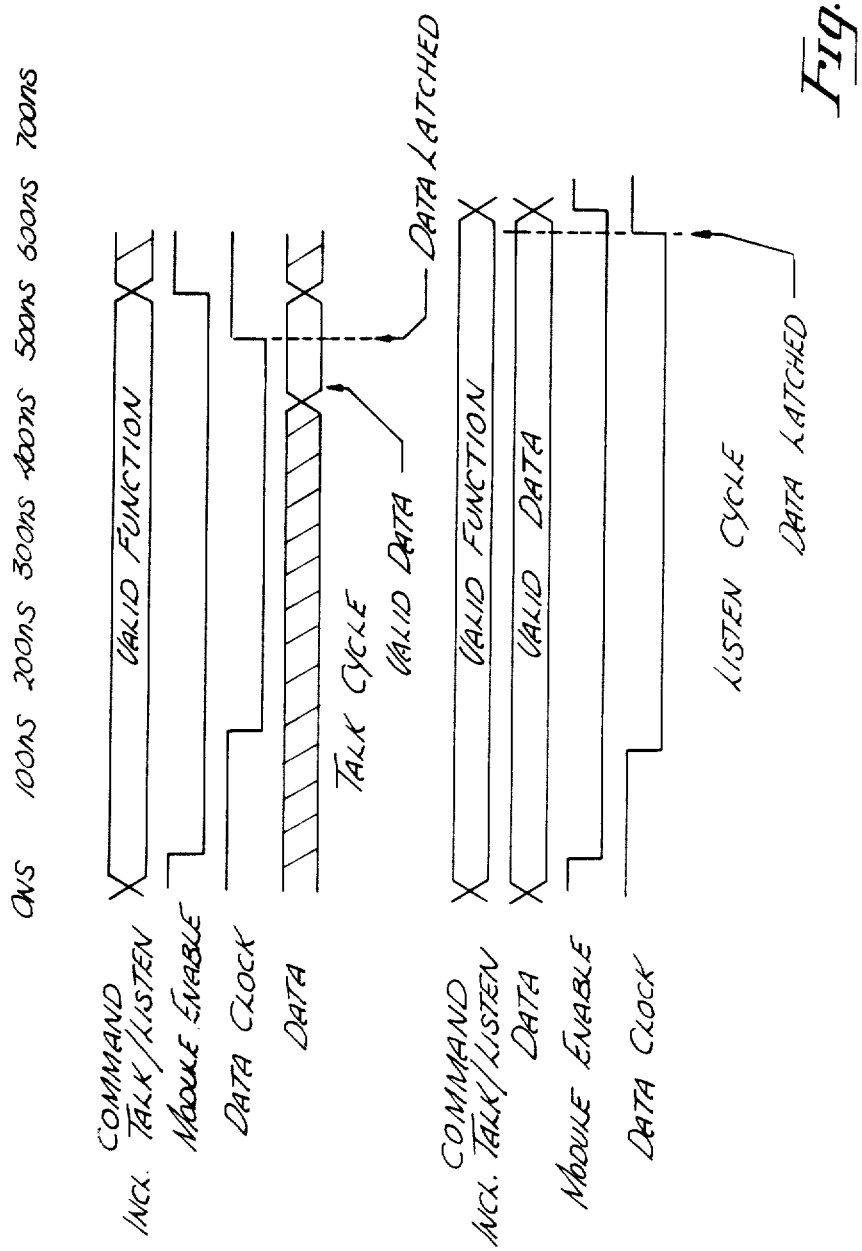
FIG. 7 illustrates timing diagrams for "talk" and "listen" cycles for transferring data on the bus of the present invention.

Referring now to FIG. 7, the sequence of events for the transmission and reception of data between CP device 10 and a desired instrument module 34 coupled through high speed bus 26 and 30 is disclosed. In the event that data is to be transmitted to an instrument module 34 from CP device 10, the illustrated "listen" cycle protocol is followed to accomplish the data transmission to the instrument module 34. As shown, CP device 10 transmits a unique digital function code corresponding to a desired module function on the command bus 34. The function code identifies the operation to be performed by the desired electrical instrument module 34, such as by way of example the sampling of some external parameter such as temperature by a digital thermometer, the measurement of a voltage by a digitally programmable volt meter, or the simple opening or closing of a digitally controlled relay or switch. As will be discussed, CP device 10 may also provide a unique digital code which requests each electrical instrument module 34 coupled to the present invention's high speed bus to provide its model identification number on the data bus as part of a polling routine. As illustrated in FIG. 7, data to be transmitted from CP device 10 to a particular instrument module 34 is asserted on data bus 42 and is maintained valid throughout the entire listen cycle. Although not shown, CP device 10 further generates an appropriate signal on talk/listen line 46 to alert the modules 34 that data will be transmitted from CP device 10 along the high speed bus toward the modules.

Subsequent to the assertion of data on data bus 42 by CP device 10, CP device 10 enables the particular receiving instrument module 34 by transmitting the address of the module on the high speed bus through enable bus 52. As previously discussed, this address is decoded by main frame bus driver/receiver 28 such that a unique enable line 54 coupled to the particular electrical module 34 to be enabled is activated. Once the desired instrument module 34 has been enabled, CP device 10 asserts a data clock signal on clock line 40 which upon deassertion (approximately 450 nanoseconds after assertion) the enabled instrument module 34 accepts and latches the received data from the data bus 42. Accordingly, it will be appreciated that the complex handshaking required by prior art data transfer devices and methods is not required by the present invention, and that data may be readily transferred from the CP device 10 to a particular module 34 coupled to the present invention's bus at high speed and using only a minimum of steps.

Referring once again to FIG. 7, the sequence of events in the case where an electrical instrument module 34 desires to transmit data to CP device 10 will be described. As shown, an appropriate function code is applied by CP device 10 to command bus 44 (for example, a "read voltage" or other function code), which is followed by a module enable signal generated by CP device 10 and asserted on the module bus 52. The enabled electrical instrument module 34 applies data to be received by CP device 10 to the data bus 42, and the data is received and considered valid by CP device 10 upon the deassertion of a clock signal provided on data clock line 40 by CP device 10. Although not shown, CP device 10 further provides an appropriate signal on talk/listen line 46 to denote data transmission from instrument modules 34 to CP device 10 thereby identifying the direction of data transmission on data bus 42. In practice, the selected instrument module 34 is enabled approximately 40 nanoseconds after the function code has been applied to the command bus 44, and the particular instrument module 34 must respond with valid data on data bus 42 within approximately 300 nanoseconds after the assertion of the clock signal on data clock line 40. In the present embodiment, the data is held valid for approximately 20 nanoseconds after the deassertion of the clock signal.

Figure 4:
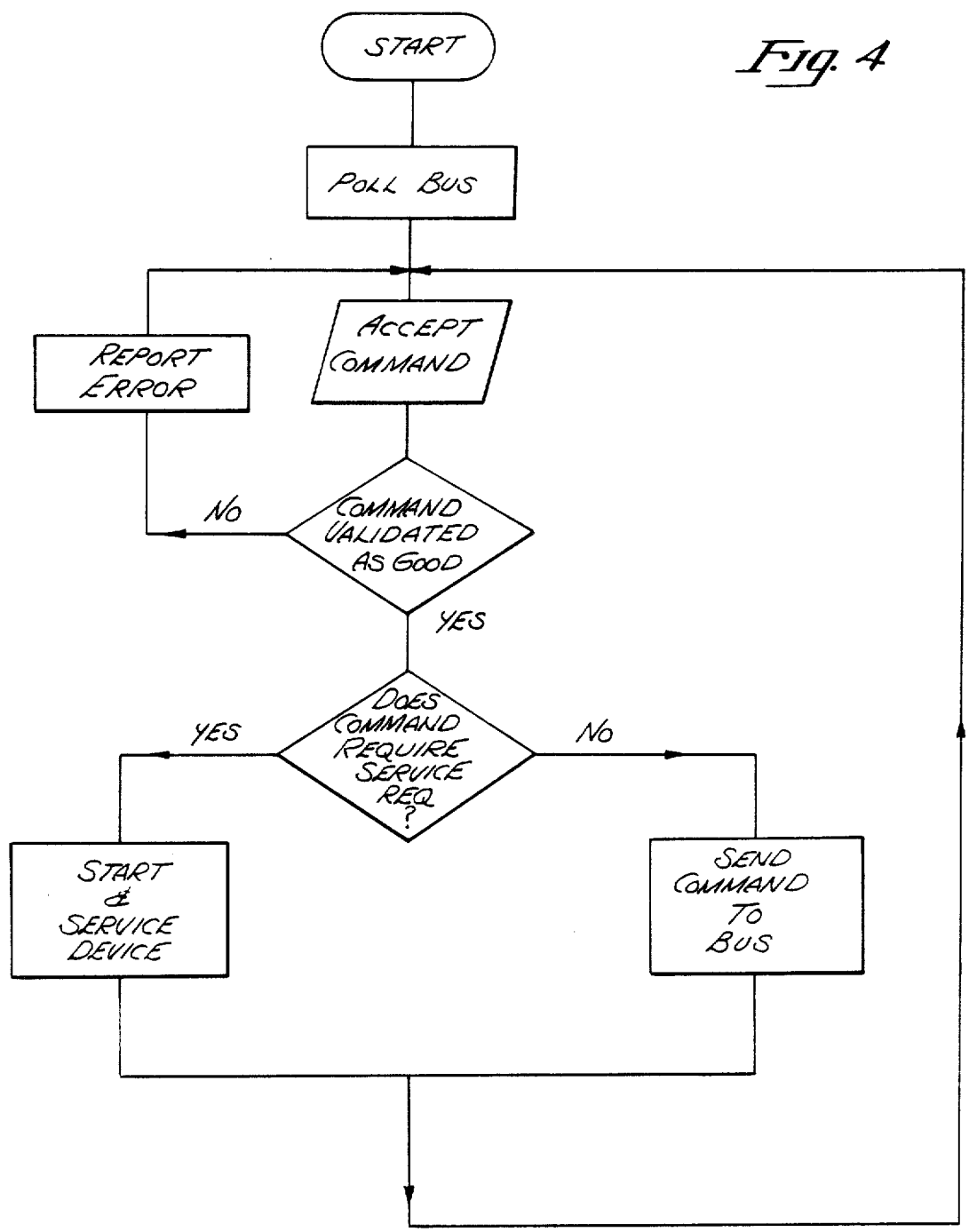
FIG. 4 is a flowchart illustrating the general operation of the present invention.
Figure 5:
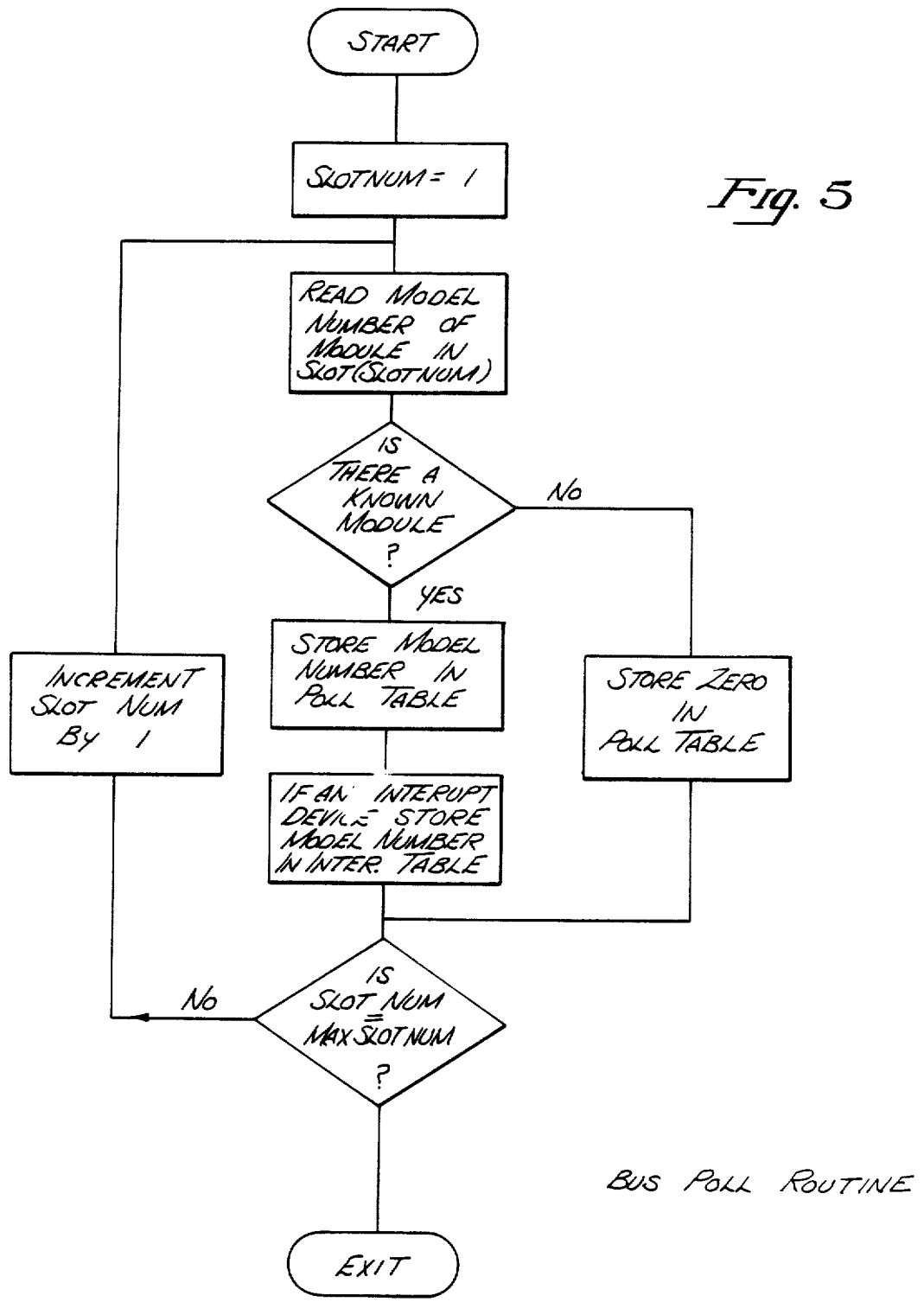
FIG. 5 is a flowchart illustrating the sequence of logical operations executed by the central processing device in order to poll electrical modules coupled to the high speed bus of the present invention.

Referring now to FIG. 4, the general operation of the present invention's high speed instrument bus is disclosed. As shown, after power-up CP device 10 initiates a poll routine wherein each address (referred to as a "slot") to which an instrument module 34 may be coupled to the high speed bus 30 is sequentially polled (from slot 1 through 62). As illustrated in FIG. 5, the present invention's poll routine defines a variable "slotnum" and initially sets the value of this variable to 1. Using the signal protocol illustrated in FIG. 7 for the "listen" cycle, CP device 10 issues a model identification function code on command bus 44, thereby requesting the electrical instrument module 34 residing in the address corresponding to slot number 1 to report its model identification number stored permanently in memory means located within each module 34. Using the protocol previously disclosed in the "talk" cycle of FIG. 7, the instrument module 34 residing in slot number 1 transmits its model identification number on data bus 42 to the CP device 10. CP device 10 then verifies whether or not the module identification number corresponds to a known module, and if so, stores the model number in a poll table defined within storage means accessible and coupled to the central processing unit 12. CP device 10 further determines if the module identification number provided from the instrument module 34 located in slot number 1 corresponds to an interruptable device, and if so, stores the model identifiation number of the instrument module 34 in slot number 1 in a interrupt table located in another portion of the storage means accessible to central processing unit 12. In the event that the model identification number does not correspond to a known module, a logical 0 is stored in the poll table. As shown in FIG. 5, the slot number is incremented by 1 and the previously described polling operation is continued until each electrical instrument module 34 coupled to the high speed bus 30 has been polled and its module identification number stored for later use by the CP device 10.

Referring again to FIG. 4, once each electrical instrument module 34 coupled to the present invention's bus has been polled, CP device 10 is ready to accept commands from a user. If a user inputs a command, using for example keyboard 20, the command is validated by CP device 10 as a permissible command then operated upon. If the command does not require a response by a particular electrical instrument module 34 coupled to the present invention's bus, CP device 10 then issues the appropriate command (in the form of a function code plus any necessary data) to the particular electrical module 34 using the listen cycle disclosed in FIG. 7.

Figure 6:
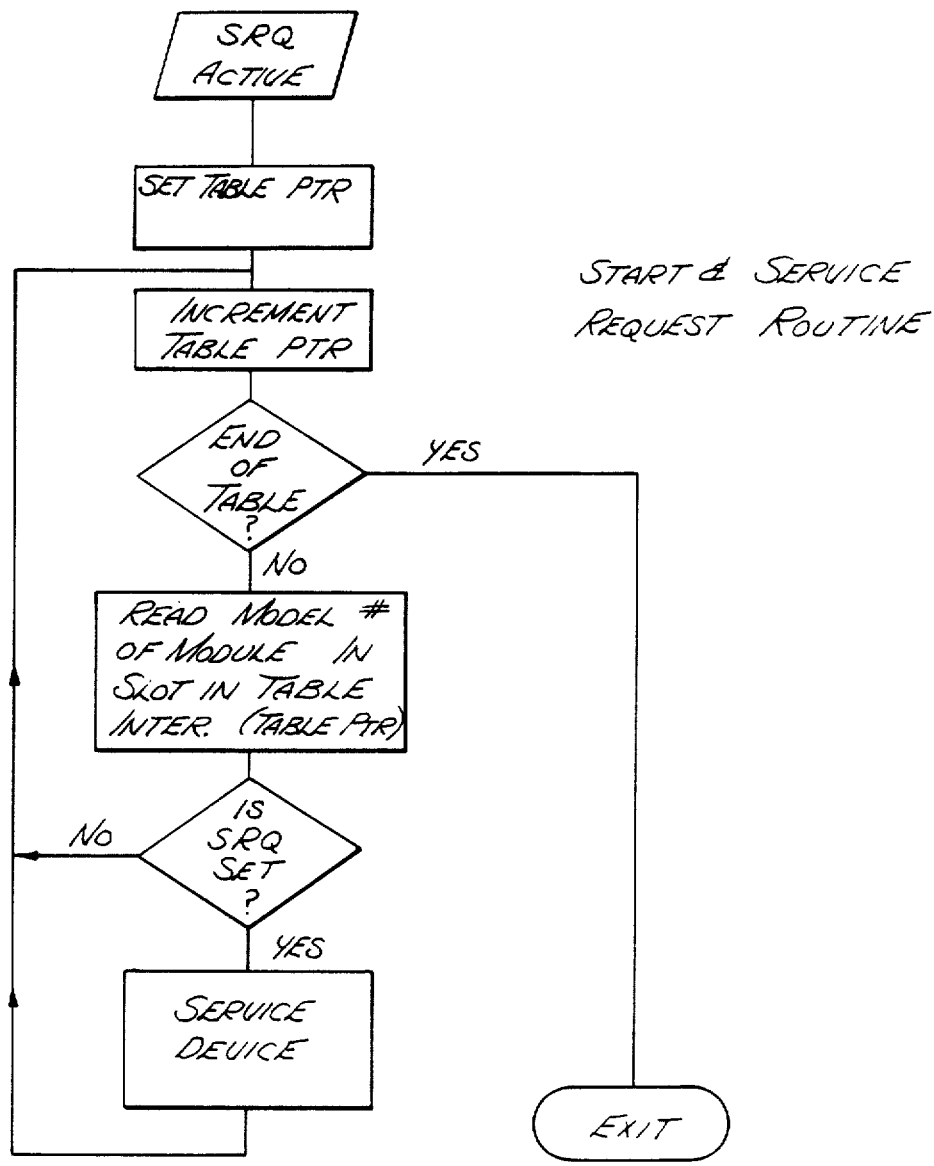
FIG. 6 is a flowchart illustrating the sequence of operations executed by the central processing device to receive data from an electrical module coupled to the high speed bus of the present invention.

In the event that the command requires a response by an electrical instrument module 34 then CP device 10 initiates a start and service request routine which is illustrated in FIG. 6. As shown in FIG. 6, CP device 10 issues the appropriate function code and initiates the measurement, parameter setting or other operation to be performed by a particular electrical instrument module 34, following the protocol illustrated in FIG. 7 for the listen cycle. Once the appropriate function along with any necessary data has been transmitted to the desired instrument module 34, CP device 10 awaits the reception of a service request (SRQ) signal from the enabled instrument module 34. Once the enabled instrument module 34 has completed the measurement, parameter setting, or other operation requested by CP device 10, the particular instrument module 34 then signals CP device 10 using service request line 50 that it is prepared to transmit data to the CP device 10.

Upon sensing a service request signal on service request line 50, CP device 10 sets a table pointer to equal 0 within the storage means storing the interrupt table of model identification numbers and sequentially determines whether or not each module has set a service request flag by sending a signal on the service request line 50. Once CP device 10 has located the first module requesting service, and after altering the state of talk/listen line 46 to indicate data transfer from instrument module to CP device 10, data is received from the enabled and awaiting instrument module 34 following the protocol identified in FIG. 7 for the talk cycle. After the particular instrument module 34 has been serviced, CP device 10 continues to examine the service request flags within the interrupt table to determine if another module requires service. When the service request line has returned to its normally low state, CP device 10 exits the routine as illustrated in FIG. 6.

Accordingly, instrument modules coupled to the present invention's bus have the ability to signal the CP device 10 that they are ready for service by asserting the service request line 50. In operation, the sevice request line is connected to a predetermined interrupt priority level within the central processing unit 12 such that on receiving an interrupt through the service request line 50, the CP device 10 will mask all interrupts below a set level and then vector through locations within the interrupt table in order to determine which instrument has actually interrupted the central processing device 10. Polling within the interrupt table is done by reading the model numbr of each interruptable electrical instrument module 34 and examining bit number 15 which is reserved as the service request flag. If bit number 15 is set, CP device 10 then branches to the appropriate service routine in accordance with the particular instrument module's characteristics.

For purposes of illustration, assume that a programmable digital volt-meter is coupled as an insrument module 34 to high speed bus 30. Prior to any measurement, CP device 10 provides a function code corresponding to a bias power supply level on command bus 44 to a desired bias power supply (i.e. 36 or 37). This function code effectively acts as a command to the particular bias power supply to provide bias power on selected lines of the bias power bus 38. The bias power level chosen corresponds to the level required by the particular logic family utilized by the digital driver/receiver modules (e.g. TTL or ECL). CP device 10 then signals the digital volt-meter which bias power lines on high speed bus 30 to couple to for proper bias power, by providing an appropriate function code on the command bus 44.

Once the bias power level has been set, CP device 10 provides a further function code corresponding to a voltage range setting command on command bus 44 for transmission to the volt-meter module. This function code acts as a command to the programmable volt-meter to set the appropriate measurement range to the numeric range provided on the data bus 42. In addition, CP device 10 signals all instrument modules 34 as well as the volt-meter 35 module that data will be transmitted from the CP device 10 by providing an appropriate signal on talk/listen line 46. The range data is received by the programmable volt-meter in accordance with the protocol identified as the listen cycle in FIG. 7. Once the range has been received and set by the programmable volt-meter, CP device 10 issues a "start" command using an appropriate function code on command bus 44 and transmits a "start" bit on data bus 42 to the volt-meter 35, in accordance with the listen protocol.

CP device 10 then awaits a service request (SRQ) signal notifying CP device 10 that the requested voltage measurement has been taken. The volt-meter requests service on request line 50 by appropriately altering the state of line 50. The activation of the service request line initiates the service request routine disclosed in FIG. 6, such that CP device 10 sends a "read voltage" function command on command bus 44 to the previously enabled volt-meter and receives data representative of the particular voltage measured along high speed bus 26, and particularly data bus 42, using the protocol of the talk cycle. Accordingly, electrical instrumnt modules 34 coupled to the present invention's high speed bus structure may communicate with the CP device 10 and transfer data at high speed and in a minimum number of steps.

As illustrated in FIG. 3, secondary high speed bus 30 includes sub-command lines 53. Sub-commands lines 53 are coupled between various instrument modules 34 and timing modules 35. In the present embodiment, sub-command lines 52 are not coupled to main frame driver/receiver 28 or to the primary high speed bus 26. The sub-command lines 53 are used for various applications requiring module to module communication, and permit operations on the secondary bus 30 to be conducted independently of operations on the primary bus 26. A typical example of the use of sub-command lines 53 is for error detection and notification. A module 34 which detects an error asserts a sub-command line which has been allocated to error detection. Timing module 35, upon sensing the assertion of the error line, in turn asserts the service request line 50 to notify the CPU 12 of the error condition. Similarly, sub-command lines 53 may be allocated such that CPU 12 is alerted as to the completion of a module function by the assertion of the SRQ line 50 by timing module 35, in response to the assertion of the appropriate sub-command line by the particular module. Thus, the use of selectively allocatable sub-command lines 53 minimizes traffic on the primary bus 26, and permits the independent operation of bus 30. It will be appreciated that the use of sub-command lines 53 for error notification is merely one example of the utility of lines 53, and that numerous other uses are contemplated depending on the particular application.

Figure 8:
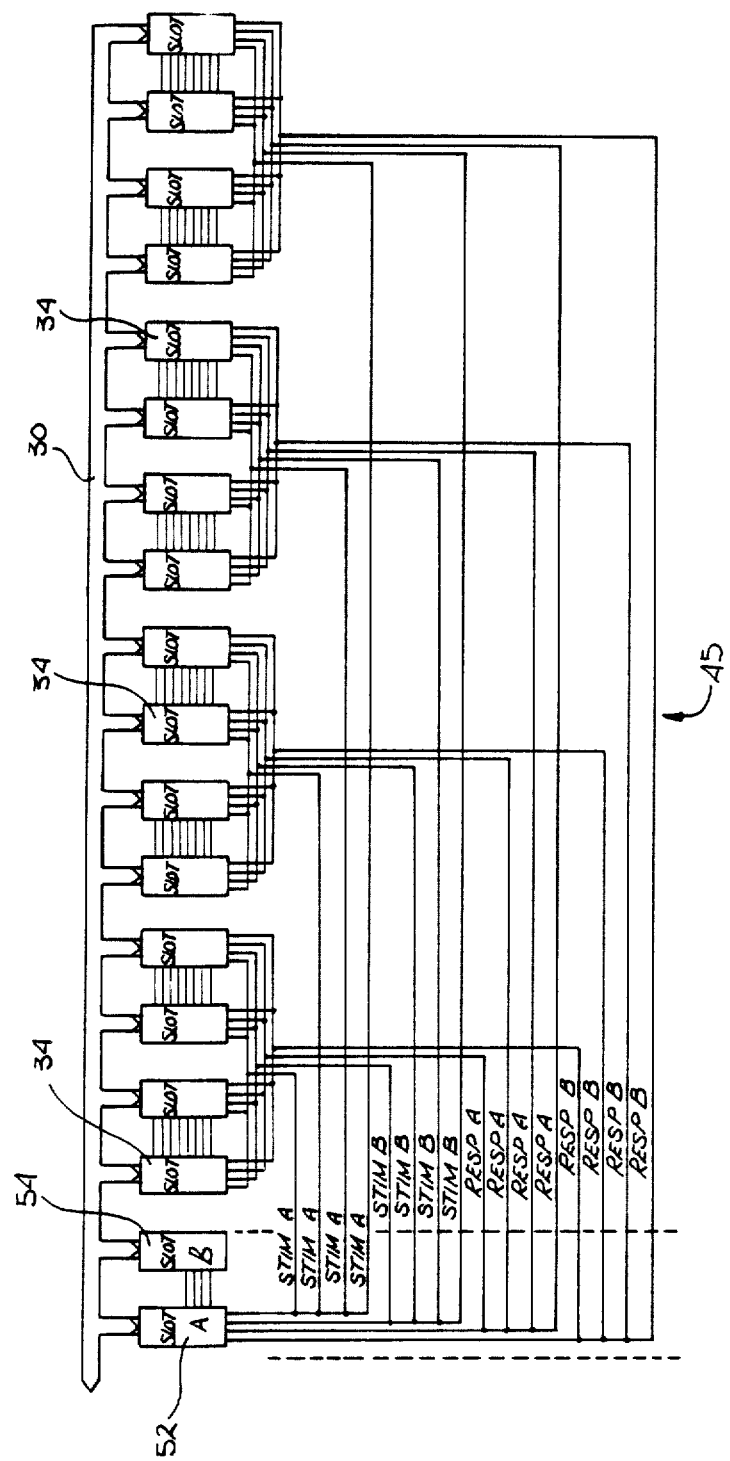
FIG. 8 is a schematic of the present invention's clock distribution lines, for providing simultaneous clock signals to each electrical module.

Referring now to FIG. 8, timing module 35 is coupled to each instrument module 34 as well as to secondary high speed bus 30, to provide appropriate timing signals to each module. Due to signal propogation delays which are dependent on path length, it is important to apply all timing signals substantially simultaneously to each instrument module for proper bus operation. Timing module 35 includes independent clocks 52 (clock "A") and 54 (clock "B" in FIG. 8). Each clock generates stimulation clock signals ("STIM") and response clock signals ("RESP") in order to clock the input and output of the various instrument modules 34. Although clock 54 is illustrated as being coupled to clock 52, the clock signals generated by clock 54 are transparently passed thorugh clock 52 without alteration, thereby permitting asynchronous operation between the two clocks.

As shown, stimulation and response clock lines are coupled to clock 52. Similarly, stimulation and response clock lines ("STIM B" and "RESP B") are coupled to clock 54 through clock 52. These lines are in turn coupled in a parallel fashion to groups of four adjacent slots in which instrument modules 34 are located. Every four adjacent slots on bus 30 are bussed together in a parallel manner, so as to permit a STIM or RESP clock signal generated by either clock 52 or 54 to be simultaneously received by all instrument modules on the bus. Although FIG. 8 illustrates each line coupling a slot group to a clock line as having variable length dependent on the slot group location, in practice the layout of all clock lines is such that each line is substantially the same length. In the present embodiment, each clock has four parallel drivers such that one clock can drive four slots groups. The clock signals are routed with tri-lead cables trimmed to the same length, and the clock lines are connected to the center of the four adjacent slots with 50 ohm terminations at the point of connection. The present invention's unique clock distribution line structure assures a very short clock transmission stub for good signal quality.

Although the present invention has been described particularly with reference to the embodiment illustrated in FIG. 1, it will be apparent to one skilled in the art that the present invention has utility far exceeding that disclosed for instrumentation and measurement systems. For example, by providing appropriate processing and storage logic to an electrical instrument module, the high speed bus and data transfer method of the present invention may be used to permit the communication and transfer of data between instrument modules without the necessity of communicating with a centralized processing device. It is contemplated that many changes and modifications may be made, by one of ordinary skill in the art, without departing from the spirit and scope of the invention as disclosed above.

We claim:

1. A system for high speed, address independent data and command transferral between a computer and a plurality of instrument modules, comprising:

a high speed bus comprised of a plurality of multipurpose lines and buses;

a data bus and a command bus in said high speed bus coupled to said computer and to each of said instrument modules;

a module polling means coupled to said computer wherein, after power up of said computer, said polling means sequentially polls each of said instrument modules by issuing a model identification number on said command bus to which each of said instrument modules may be coupled;

a data transmission and reception means respectively coupled to said computer, to said data bus, to said command bus and to each of said instrument modules for transmitting and receiving data over said data bus and said command bus in accordance with a desired instrument operation defined by a function code;

a first storage means in each of said instrument modules for storing instrument means identification numbers, wherein said data transmission and reception means transmits said module identification number to said computer upon receipt of said model identification number by said reception means;

a second storage means in said computer for storing said instrument module identification number received from said instrument modules in a poll table wherein said poll table associates an address slot in said poll table with said identified module thereby allowing any module to be associated with any slot;

function code generation means coupled to said computer for generating a function code (#0 . . . N) corresponding to a desired instrument operation and transmitting to said instrument modules said code on said command bus;

a plurality of enable lines coupled to said computer and each of said instrument modules;

module enabling means coupled to said computer and each of said enabling lines for sequentially generating an enable signal and transmitting said enable signal on an enable line connected to a selected instrument module, such that said selected instrument module is enabled for data transfer and function code reception;

a function code receiving means coupled to each of said instrument modules, said enable line and said command bus for decoding said function code provided to said enabled instrument module into a unique operation for execution by said instrument module on receipt of said enable signal;

whereby a high speed data transfer occurs as a result of associating said instrument identification number in said poll table with an associated address slot and an associated function code such that said instrument modules can be coupled to any slot.

2. The system as defined by claim 42, whereby said instrument module identification number corresponds to the type of instrument said instrument module comprises.

3. The system as defined by claim 2, wherein said data transmission and reception means of said enabled module transmits said instrument module identification number stored in said first storage means on said data bus, upon receipt of said model identification code.

4. The system as defined by claim 3, wherein said model identification code induces transmission of said module identification number by said instrument modules by placing a logical '0' in a slot in said poll table.

5. The system as defined by claim 3, wherein upon providing initial power to said computer, said computer sequentially transmits an enable signal to each of said instrument modules.

6. The system as defined by claim 5, wherein said second storage means includes a list of function codes provided in a function table identifying for each instrument module identification number stored in said poll table a list of function codes such that each function code defines corresponding instrument module operations.

7. The system as defined by claim 6, wherein said computer includes:
 verification means for verifying the authenticity of each of said received instrument module identification numbers and determining if each of said received module instrument identification number corresponds to an interruptable instrument module;
 said verification means verifying the authenticity of a received instrument module identification number and determining if said number corresponds to an interruptable instrument module by comparing said received number to a table comprising all legitimate instrument module identification numbers stored in said second storage means.

8. The system as defined by claim 9, further including service request means respectively coupled to each of said instrument modules for generating a service request signal in the event data transfer is requied, and transmitting said signal to said computer on a service request line coupled to each of said instrument modules and said computer.

9. The system as defined by claim 8, further including talk/listen signal generation means coupled to said computer for generating a talk/listen signal identifying the direction of data transfer on said data bus, and transmitting said signal onto a talk/listen line coupled to said computer and each of said instrument modules.

10. The system as defined by claim 9, wherein said computer further includes clock means for generating clock signals and transmitting said clock signals onto at least one clock line coupled to each of said instrument modules.

11. The system as defined by claim 10, wherein an enabled instrument module transmits data on said data bus after generating and transmitting said service request signal to said computer, and continues to transmit said data for a predetermined time after said instrument module receives a clock signal on said clock line.

12. The system as defined by claim 11, further including sub-command control means coupled to each of said instrument modules for providing communication and control signals between each of said instrument modules such that each of said selected instrument modules may execute module to module communications independently of said computer, thereby permitting said computer to communicate with other instrument modules while a selected instrument module executes a function.

13. The system as defined by claim 12, further comprising a timing module coupled to said sub-command control means and said service request line and including said service request means, such that said timing module asserts said service request signal after receiving a sub-command control signal denoting the completion of said selected instrument module function.

14. The system as defined by claim 11, further including:
 a bias power supply coupled to said computer, said bias power supply including said function code receiving means for receiving said function codes, wherein said function codes received by said bias power supply correspond to bias power levels to be provided by said bias power supply;
 a bias power bus coupled between said bias power supply and at least one of said instrument modules, such that said bias power supply provides bias power to at least one of said instrument modules at a level determined by said function code.

15. The system as defined by claim 11, wherein said clock means includes:
 at least one clock coupled to stimulation ("STIM") and response ("RESP") clock lines;
 said instrument modules being grouped, such that a predetermined number of modules are coupled to a common pair of clock lines;
 a pair of STIM and RESP clock lines being coupled to each of said groups of instrument modules in parallel, such that each clock signal generated by said clock is simultaneously received by said group of said modules.

16. The system as defined by claim 15, wherein said clocking means further includes a second clock providing STIM and RESP signals independently of said first clock, said second clock being coupled to said groups of said modules, such that each clock signal from said second clock is simultaneously received by said group of said modules.

17. A method for transferring data and commands at high speed between a computer and a plurality of instrument modules comprising the steps of:
 said computer, upon power-up, sequentially generating model identification code signals to each of said instrument modules;
 said instrument module transmitting an instrument module identification number onto a data bus coupled to said computer and each of said instrument modules;
 said computer storing said instrument module identification number received from each of said instrument modules in a poll table;
 said computer associating an address slot in said poll table with each of said module identification numbers;
 said computer generating a digital function code (#0 ... N) corresponding to a desired instrument operation and transmitting said function code on a command bus coupled to said computer and to each of said instrument modules;
 said computer generating a module enable signal and transmitting said signal on one of a plurality of enable lines coupled to said computer and to each of said instrument modules such that said selected instrument module is enabled for data transfer and function code reception;
 said enabled instrument module decoding said function code into a unique operation to be executed by said instrument module upon receipt of said enabled signal;
 said enabled instrument module transmitting and receiving data on a data bus coupled to said computer and to each of said instrument modules in accordance with a desired instrument operation defined by said function code;

whereby said enabled instrument module executes said desired operation corresponding to said function code and associates said instrument module with an address slot such that said instrument module can be coupled to any slot.

18. The method as defined by claim 17, further including the step of said computer generating clock signals and transmitting said clock signals to each of said instrument modules such that data transmission and reception are synchronized.

19. The method as defined by claim 8, wherein each of said instrument modules includes a first storage means for storing said instrument module identification number corresponding to its specific instrument type.

20. The method as defined in claim 19, further including the step of said computer storing the instrument module identification numbers of interruptable instrument modules in an interrupt table within a second storage means coupled to said computer.

21. The method as defined by claim 20, wherein an enabled instrument module generates a service request signal on a service request line coupled between said instrument modules and said computer in the event data transfer is required, to notify said computer that said enabled module is ready for service.

22. The method as defined by claim 21, wherein said computer generates a talk/listen signal identifying the direction of data transfer on said data bus, and transmits said talk/listen signal on talk/listen line coupled to said computer and said instrument modules.

23. The method as defined by claim 21, wherein said computer includes verification means for verifying the authenticity of each of said received instrument module identification numbers and determining if each of said received instrument identification numbers corresponds to an interruptable instrument module;

said verification means verifying the authenticity of a received instrument module identification number and determining if said number corresponds to an interruptable instrument by comparing said received number to a table comprising all legitimate instrument module identification numbers stored in said second storage means.

24. The method as defined in claim 23, wherein an enabled instrument module transmits data on said data bus after generating and transmitting said service request signal to said computer, and continues to transmit said data for a predetermined time after said module instrument receives a clock signal.

25. The method as defined by claim 24, further including sub-command control means coupled to each of said instrument modules for providing communication and control signals between each of said instrument modules such that each of said selected instrument modules may execute module to module communications independently of said computer, thereby permitting said computer to communicate with other instrument modules while a selected instrument module executes a function.

26. The method as defined by claim 25, wherein said timing module is coupled to said service request line and includes said service request means, such that said timing module asserts said service request signal after receiving said sub-command control signal denoting completion of said selected instrument module function.

27. The method as defined by claim 26, wherein said clock means includes:

at least one clock coupled to a stimulation ("STIM") and a response ("RESP") clock line;

said instrument modules being grouped, such that a predetermined number of modules are coupled to a common pair of clock lines;

a pair of STIM and RESP clock lines being coupled to each of said groups of instrument modules in parallel, such that each clock signal generated by said clock is simultaneously received by said group of said modules.

28. A method for transmitting data and commands on a bus between a selected instrument module and a computer, comprising the steps of:

said computer, upon power up, sequentially generating predetermined function code signals to each of said instrument modules;

said instrument module transmitting an instrument module identification number onto a data bus coupled to said computer and each of said instrument modules;

said computer storing said instrument module identification number received from each of said instrument modules in a poll table;

said computer associating an address slot in said poll table with each of said module identification numbers;

said instrument module generating a service request signal to notify said computer that said instrument module is ready for service and transmitting said service request signal to said computer on a service request line coupled to said computer and said instrument module;

said computer generating a digital function code in response to said service request signal (#0 ... N) corresponding to a desired instrument operation and transmitting said code onto a plurality of command lines coupled between said selected instrument module and said computer;

said computer enabling said selected instrument module by transmitting an enable signal on an enable line coupled between said computer and said selected instrument module, such that said instrument module is enabled for data transfer and function code reception;

said enabled instrument module decoding said function code into a unique operation to be executed by said instrument module on receipt of said enable signal;

said enabled instrument module transmitting and receiving data on a plurality of data lines coupled to said computer and to said selected instrument module in accordance with a desired instrument operation defined by said function code;

said computer providing a clock signal on a clock line coupled to said computer and to said instrument module such that said transmitted data is received by said computer on receipt by said instrument module of said clock signal.

29. A system for transferring data and commands at high speed between a computer and a plurality of instrument modules, comprising:

a plurality of instrument slots coupled over common lines to said computer, wherein said instrument modules are disposed in said slots, said instrument modules being coupled to said common lines in each slot by coupling means disposed in each of said slots, and on each of said instrument modules;

a first storage means in each of said instrument modules for storing an instrument module identification number wherein said data transmission and reception means transmits said module identification number to said computer upon receipt of said model identification number by said reception means;

a second storage means in said computer for storing said instrument module identification number received from said instrument modules in a poll tale wherein said poll table associates an address slot in said poll table with said identified module thereby allowing any module to be associated with any slots;

function code generation means coupled to said computer for generating a function code (#0 . . . N) corresponding to a desired instrument operation and transmitting said code on a command bus defined by a first predetermined number of said common lines, and coupled to said computer and each of said instrument modules disposed in said slots;

a second predetermined number of said common lines defined as enable lines, one of each of said enable lines coupled to said computer and to each of said instrument slots, each of said enable lines coupled to said instrument modules through said coupling means;

module enabling means coupled to said computer for generating an enable signal and transmitting said enable signal on an enable line corresponding to a selected instrument slot, such that said instrument module disposed in said selected slot is enabled for data transfer and function code reception;

each of said instrument modules including function code receiving means coupled to said enable line, and said command bus for decoding said function code provided to said enabled instrument module into a unique operation to be executed by said instrument on receipt of said enable signal;

a third predetermined number of said common lines defined as a data bus coupled between said computer and each of said instrument slots, and thereby coupled through said coupling means to each of said instrument modules;

data transmission and reception means coupled to said computer and each of said instrument modules for transmitting and receiving data over said data bus in accordance with a desired instrument operation defined by said function code;

whereby said enabled instrument module executes said desired operation corresponding to said function code.

30. A system for transferring data and commands at high speed between a computer and a plurality of instrument modules, comprising:

function code generation means coupled to said computer for generating a function code (#0 . . . N) corresponding to a desired instrument operation and for transmitting said code on a command bus coupled to said computer and each of said instrument modules;

a plurality of enable lines coupled to said computer and to each of said instrument modules;

module enabling means coupled to said computer for generating an enable signal and transmitting said enable signal on said enable line corresponding to a selected instrument module, such that said selected instrument module is enabled for data transfer and function code reception;

function code receiving means coupled to each of said modules, said enable line, and said command bus for decoding said function code provided to said enabled instrument module into a unique operation to be executed by said instrument module upon receipt of said enable signal;

a data bus coupled between said computer and each of said instrument modules;

data transmission and reception means coupled to said computer and each of said instrument modules for transmitting and receiving data over said data bus in accordance with a desired instrument operation defined by said function code whereby said enabled instrument module executes said desired operation corresponding to said code; and subcommand control means coupled to each of said instrument modules for providing communication and control signals between each of said instrument modules such that each of said selected instrument modules execute module to module communications independently of said computer, thereby permitting said computer to communicate with other instrument modules while a selected instrument module executes a function.

* * * * *

UNITED STATES PATENT AND TRADEMARK OFFICE
CERTIFICATE OF CORRECTION

PATENT NO. : 4,710,893
DATED : 12/01/87
INVENTOR(S) : McCutcheon et al.

It is certified that error appears in the above-identified patent and that said Letters Patent is hereby corrected as shown below:

| COLUMN | LINE | DESCRIPTION |
|--------|------|-------------|
| 01 | 55 | delete "cas" insert --case-- |
| 06 | 10 | delete "module" insert --enable-- |
| 07 | 52 | delete "sevice" insert --service-- |
| 07 | 61 | delete "numbr" insert --number-- |
| 07 | 68 | delete "insrument" insert --instrument-- |
| 08 | 44 | delete "instrumnt" insert --instrument-- |

Signed and Sealed this

Thirteenth Day of December, 1988

Attest:

DONALD J. QUIGG

Attesting Officer

Commissioner of Patents and Trademarks